United States Patent [19]

Granger

[11] Patent Number: 5,483,277
[45] Date of Patent: Jan. 9, 1996

[54] SIMPLIFIED SET-TOP CONVERTER FOR BROADBAND SWITCHED NETWORK

[75] Inventor: Alain Granger, Raleigh, N.C.

[73] Assignee: Alcatel Network Systems, Richardson, Tex.

[21] Appl. No.: 990,456

[22] Filed: Dec. 15, 1992

[51] Int. Cl.[6] ................................................. H04N 7/16
[52] U.S. Cl. ..................... 348/6; 348/7; 348/10; 455/3.1; 455/4.2
[58] Field of Search .................. 358/86; 455/4.2, 455/6.1, 6.2, 180.1, 187.1, 191.1, 131, 3.1; 348/10, 11, 12, 9, 7, 6; H04N 7/10, 7/16

[56] References Cited

U.S. PATENT DOCUMENTS

| Re. 31,295 | 6/1983 | Haley et al. | 370/120 |
|---|---|---|---|
| 3,882,266 | 5/1975 | Walding | 178/5.1 |
| 4,264,924 | 4/1981 | Freeman | 358/86 |
| 4,348,691 | 9/1982 | Mistry | 358/86 |
| 4,425,579 | 1/1984 | Merrell | 358/86 |
| 4,488,179 | 12/1984 | Kruger | 348/731 |
| 4,538,174 | 8/1985 | Gorgiri et al. | 348/7 |
| 4,914,516 | 4/1990 | Freeman | 348/11 |
| 4,994,909 | 2/1991 | Graves et al. | 348/12 |
| 5,151,789 | 9/1992 | Young | 358/86 |
| 5,206,722 | 4/1993 | Kwan | 358/86 |
| 5,216,499 | 6/1993 | Berkheimer | 358/86 |

FOREIGN PATENT DOCUMENTS

| 118161 | 9/1984 | European Pat. Off. | H04N 7/16 |
|---|---|---|---|
| 0314572 | 5/1989 | European Pat. Off. | H04N 7/16 |
| 0060380 | 3/1987 | Japan | H04N 7/10 |
| 0142486 | 6/1987 | Japan | H04N 7/10 |
| 0218285 | 8/1989 | Japan | H04N 7/16 |
| 0206787 | 8/1989 | Japan | H04N 7/16 |
| 4175087 | 6/1992 | Japan | H04N 7/16 |
| 2256115 | 11/1992 | United Kingdom | H04N 7/173 |

Primary Examiner—James J. Groody
Assistant Examiner—Chris Grant
Attorney, Agent, or Firm—Ware, Fressola, Van Der Sluys & Adolphson

[57] ABSTRACT

For fiber-to-the-curb program switching, which is done at the central office, the same fixed frequency slot is always used for distributing the TV program selected for a video recording device at the subscriber's premises; for its related display, another selected slot is always used for distributing another selected TV program; the set-top converter is provided with two narrow band filters, one for each dedicated slot, instead of expensive tuners; the same set-top converter can be used in other rooms of the subscriber premises, except using a plug-in tuner for placing additional selected TV programs received from remaining, nondedicated slots into the same filter band used for the TV associated with the video recording device.

12 Claims, 10 Drawing Sheets

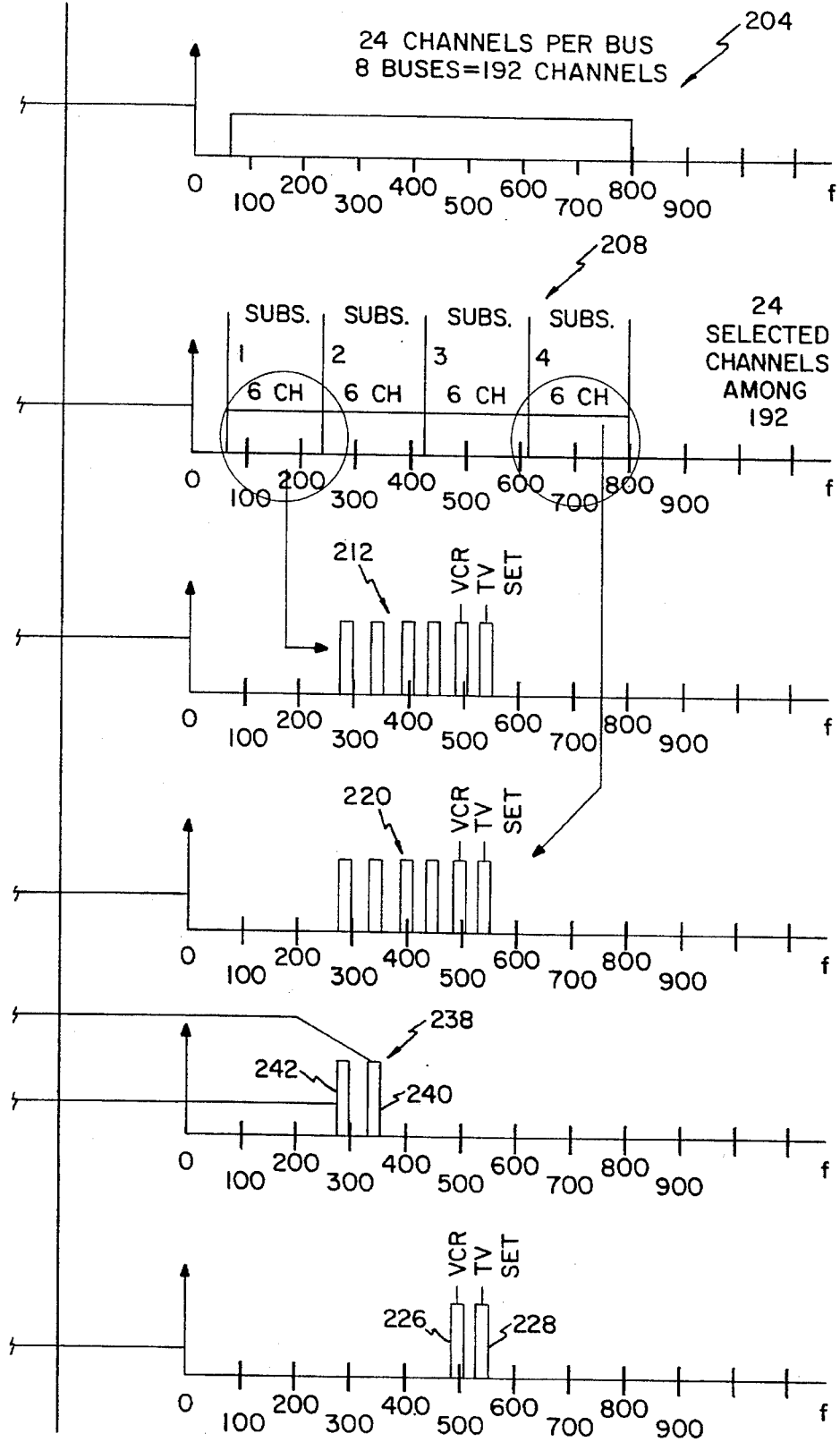

SIMPLIFIED SET-TOP CONVERTER FOR BROADBAND SWITCHED NETWORK

TECHNICAL FIELD

The present invention relates to a television set-top converter which provides simultaneous connection of a television set and a recording device such as a video cassette recorder and, more particularly, for a broadband switched video network.

BACKGROUND OF THE INVENTION

In cable TV (CATV) networks, television signals available at the subscriber's premises at the CATV cabling outlet (CP) are normally further processed by a set-top converter (STC) prior to connection to consumer TV equipment. Unfortunately, various types of consumer TV equipment are not necessarily able to directly select and process the signals coming from the CATV network. Only "cable-ready" consumer TV equipment is able to directly select and process non-scrambled channels. In any case, a set-top converter is necessary for selecting and processing "access-controlled" or premium channels since descrambling and communication functions have to be provided. The typical CATV signal provided at a subscriber's premises consists of a large plurality of AM/VSB television channels (some scrambled and most not scrambled) which are frequency division multiplexed over a very wide frequency band. Of course, each separate television channel is modulated by a different video and audio program.

In the switched video broadband system depicted in copending, co-owned U.S. patent application Ser. No. 07/739,203, now abandoned, and related applications cross-referenced therein, the selected television channels provided at the subscriber's premises are presented in the form of a frequency division multiplex of only six FM TV channels modulated by unscrambled video and audio programming. These six channels are the result of a selection and interdiction process within the network resulting from one or more end user requests from within the subscriber's premises.

The multiplex structure of a signal such as may be provided to the subscriber's premises, according to the above-cited U.S. patent application, is shown in FIG. 1. It shows six fixed channels between 300 and 550 MHz, for example. In copending, co-owned application Ser. No. 07/738,188, now abandoned, six fixed 30 MHz channels occupy a band covering 330 to 510 MHz. A block diagram of a set-top converter that could be used for tuning and demodulating such a band of FM video and sound is shown in FIG. 2.

In the above-cited patent applications a switched video, fiber-to-the-curb system is disclosed in which the six frequency division multiplexed FM modulated TV channels are delivered from an optical network unit (ONU) in a neighborhood of a plurality of subscriber premises. Each of the subscriber premises is provided with a coax drop having up to six TV channels dynamically selected by persons using different displays in each subscriber's premises. Any six FM TV channels can be delivered to each of the subscribers' premises but are always delivered in the same band, e.g., 330–510 MHz covering a total of 180 MHz with 30 MHz dedicated to each channel. The users in each subscriber's premises are individually capable of dynamically selecting channels for occupying the six slots by sending control signals from remote control units to a set-top converter which uplinks the control data back to the upstream switched video control which has access to typically hundreds of video channels. Since the central control can be programmed to recognize particular subscribers' contract data it can be used to block premium channels rather than having a descrambler associated with the set-top converter. Therefore, the channels distributed to the individual subscribers are unscrambled and only a tuner is needed to select from the switched programs distributed among the six fixed frequency channels.

As shown in FIG. 1, the frequency spectrum of such a system might use a selected narrow band 2 in the frequency band below 50 MHz for upstream (uplink) control data from the individual users to the terminal controller and a similarly narrow frequency band 4 greater than 108 MHz for any data downlinked from the terminal controller to the individual subscribers. As mentioned, a fairly wide band of 180 MHz between 300 and 550 MHz is shown in this case for carrying the six FM TV channels, each being about 30 MHz wide, for example.

The set-top converter 10 shown in FIG. 2 may include a display 12 having a channel number display. It may be used to indicate on or standby, stereo/SAP modes, network failure, etc. The display characters may be multiplexed with the video signal prior to driving the TV video output. A keyboard 14 may be used in lieu of a similar keyboard on a remote control unit 16 as a backup in case of a remote control failure. The keyboard may have updown channel selection capability, may be able to turn the set-top converter on or off or standby, and may have a sound volume control and various sound modes.

A remote control receiver 18 receives infrared coded signals 20 from the remote control unit 16. Channel selection is made by pressing an alphanumeric keyboard and/or enter key on the remote control unit 16. It may also have up-down channel selection capability, standby capability, up-down sound volume control, sound muting and various sound modes.

A central processing unit (CPU) 22 receives data from functions and manages the communications with the network. Operational tasks include the transmission of codes related to the remote control and keyboard commands, management of access protocol with the network (CSMA-CD), processing of control data coming from the network such as acknowledgment, STC selection, channel display, etc., and may also be used for maintenance functions.

The CPU interfaces with a data modem 24 on a line 25 (which includes downlinked data on a line 25a and uplinked data on a line 25b) which interfaces with the two-way RF data channels on a line 27 which multiplexed in the interface 26 on one coaxial cable with the TV channels. The CPU also manages any collisions between data channels from other STC's connected to the home premises cabling.

An input interface 26 enables the establishment of a physical connection with a home cabling RF inlet 28 as well as a bidirectional communication with the network. It performs the coupling between the incoming FM TV channels and incoming and outgoing data channels.

The STC 10 provides RF and baseband video/sound outputs from signals available at the customer port 28. This generic function is performed by a number of functional blocks to be described below.

A tuner 30 selects, converts and filters one of the six wide band FM channels available at the customer port 28 into an intermediate frequency (IF) channel. An FM video demodulator 32 demodulates the FM IF carrier in order to obtain the video and sound contents of FM channels and performs the separation of baseband video and sound subcarrier. The 140

IRE composite video NTSC signal is then split in order to drive a TVAM-modulator 34 for the video display unit, a VCR video baseband output 36 and the set-top converter display 12. The TV AM modulator 34 provides an AM-VSB TV channel with the same carrier frequency as channel 3 or 4. This carrier is modulated by the NTSC signal available from the FM video demodulator 32 and a variable monaural sound signal on a line 38 provided by a sound processor 40. A sound demodulator 42 demodulates the sound subcarrier to obtain the NTSC composite sound signal. This signal is further processed in the sound processor 40 to obtain the baseband sound contents: mono, stereo or SAP.

A power supply 44 provides for DC voltages to various STC hardware from a 110 VAC plug. A power switch (not shown) may be provided on the rear of the STC 10.

As will be clearly understood from the foregoing, the tuner function performs the selection of one channel among the six available at the RF input 28. As in a conventional CATV tuner, this function involves rather complex RF signal conditioning techniques and is therefore fairly expensive, especially the tuner.

One of the common problems a conventional CATV subscriber will meet when using the network is the simultaneous connection to a TV set and a VCR. Since there are no descrambling functions in a VCR, it cannot be directly used to record, except with non-scrambled channels. Therefore, a set-top converter is needed. Dedicated connections are commonly proposed for performing the recording of channels being watched or the recording of channels independently of the TV set status. In the configuration shown in FIG. 3A, for example, a large plurality of network channels are provided on a line 48 to a conventional set-top converter 50. The nature of the signals on the line 48 are typically AM-VSB delivered in a frequency division multiplexed format. Some of the channels will be scrambled and others will be free of scrambling. The tuner will be provided with special descrambling circuits upon payment of a premium by the subscriber. The STC 50 provides an RF output at the frequency corresponding to channel 3, for example, on a line 52. A VCR 54 is connected to the signal on the line 52 at an RF input thereof. The VCR RF output will provide an output signal on a line 56 having the STC channel 3, or channel 3 in VCR playback mode where a tape is being played back. A TV set 58 is responsive to the RF out on the line 56 from the VCR 54 and is tuned to channel 3 to display the selected video program provided on the line 56. The set-up shown in FIG. 3A permits either an unscrambled or scrambled channel to be recorded by the VCR. However, the recording of one channel while another one is watched is not possible if both are scrambled.

FIG. 3B is similar except the VCR is shown upstream of the set-top converter and is therefore only able to record unscrambled channels. Various elaborate wiring schemes are known in the art for allowing the subscriber to select either the TV set or the VCR as the equipment used to record or watch the scrambled channel while the other device is simultaneously used with an unscrambled channel.

If a subscriber wished to record one scrambled channel while watching another scrambled channel, a second set-top converter is needed leading to a rather complicated connection and an excessive cost.

The fiber-to-the-curb system disclosed in the abovecited U.S. patent application Ser. No. 07/739,203 has the same connection problem as the conventional CATV systems described above although it is different in nature. Indeed, the selection and interdiction of channels within the switched video FTC network avoids the need for a descrambler in the set-top converter. Also, since six different set-tops can be used simultaneously within the same subscriber's premises for watching or recording different ones of the six available programs that are selected, a tuner is needed in the set-top converter. This tuner is automatically adjusted by the network, through a dedicated command, to a free channel position from among the six available slots. Unfortunately, since there is only one tuner in the STC 10 of FIG. 2, two set-top converters similar to the one shown in FIG. 2 would be required to record and watch two different channels. Therefore, for a fiber-to-the-curb system, one can draw similar conclusions as those drawn for conventional CATV as described above.

Disclosure of Invention

An object of the present invention is to provide a simplified set-top converter for a broadband switched video network.

According to the present invention, for a switched video distribution system wherein a plurality of fixed frequency, frequency division multiplexed switched video program channels are provided to each of a plurality of subscribers, one of the plurality of fixed frequency channels is dedicated for use by a subscriber video recording device.

In further accord with the present invention, the one dedicated channel is selected by bandpass filtering the plurality of channels.

In still further accord with the present invention, another one of the fixed frequency channels is dedicated for use by a subscriber display associated with the subscriber video recording device.

In still further accordance with the present invention, additional channels beyond those dedicated to the subscriber video recording device and the associated subscriber display, from among remaining channels from among the plurality of fixed frequency channels may be frequency converted to a frequency corresponding to the channel dedicated for use by the subscriber display associated with the video recording device. Such would typically be used in a room different from the room in which the video recording device is located.

The following benefits are obtained using this technique: (1) no extra tuner is needed for VCR/TV set simultaneous operation; (2) the set-top converter is less expensive and less bulky in addition to providing simplified circuitry with no descramblers required, as in conventional CATV; (3) overall cost reductions. None of these benefits can be obtained in a broadcast CATV system since it is necessary to use an extra tuner and descrambler for combining TV set/VCR operation.

These and other objects, features and advantages of the present invention will become more apparent in light of the following detailed description of a best mode embodiment thereof, as illustrated in the accompanying drawing.

BRIEF DESCRIPTION OF THE DRAWING

FIGS. 5A and 5B together show a frequency plan, according to a second aspect of the present invention, with one of six fixed frequency channels delivered to all subscribers' premises dedicated, if desired, to a VCR so as to permit use with a set-top converter without any tuner;

Best Mode for Carrying Out the Invention

Figure 2:
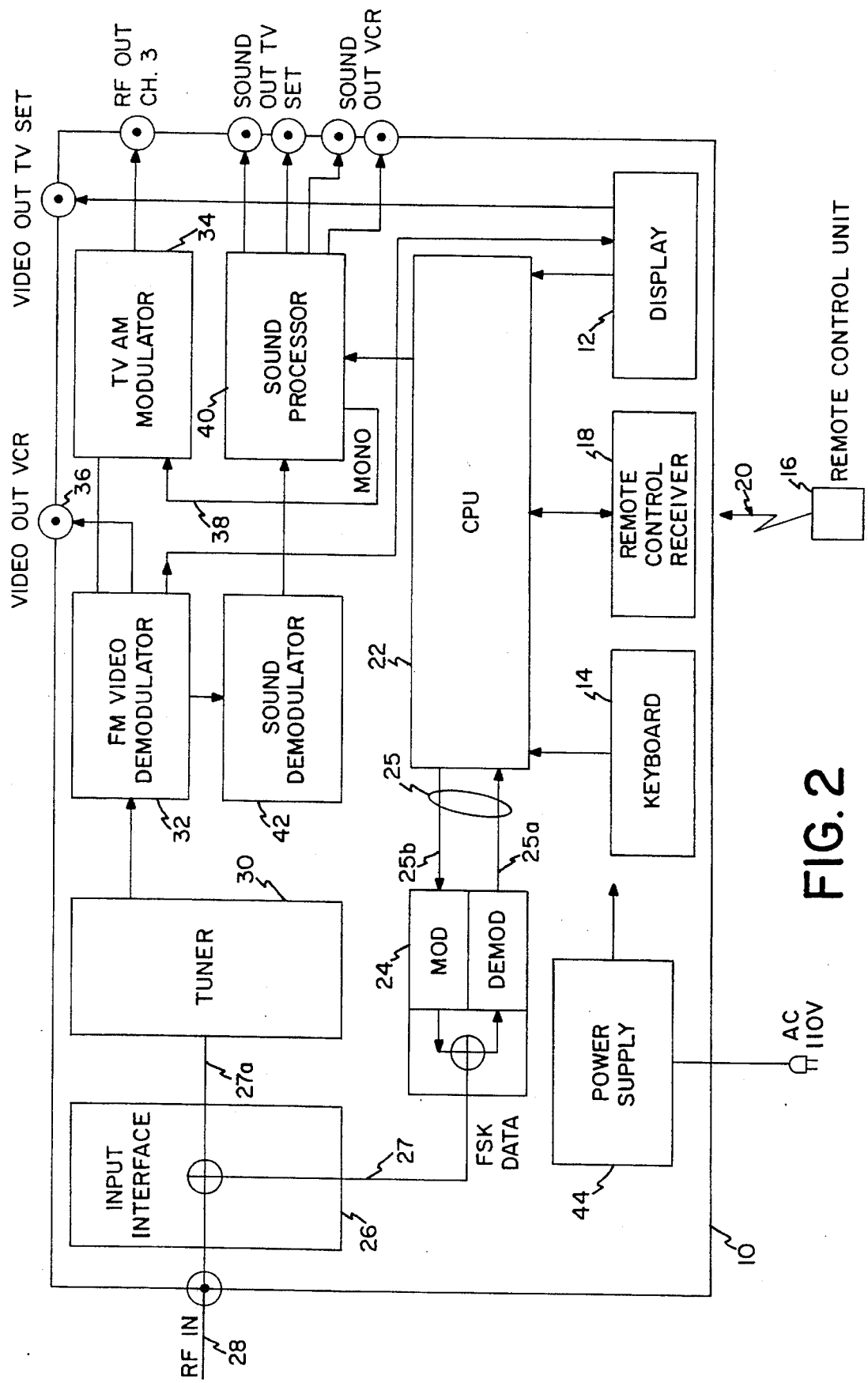
FIG. 2 shows a set-top converter that can be used in a switched video system having FM video channels delivered to subscribers according to the frequency plan of FIG. 1.
Figure 3A:
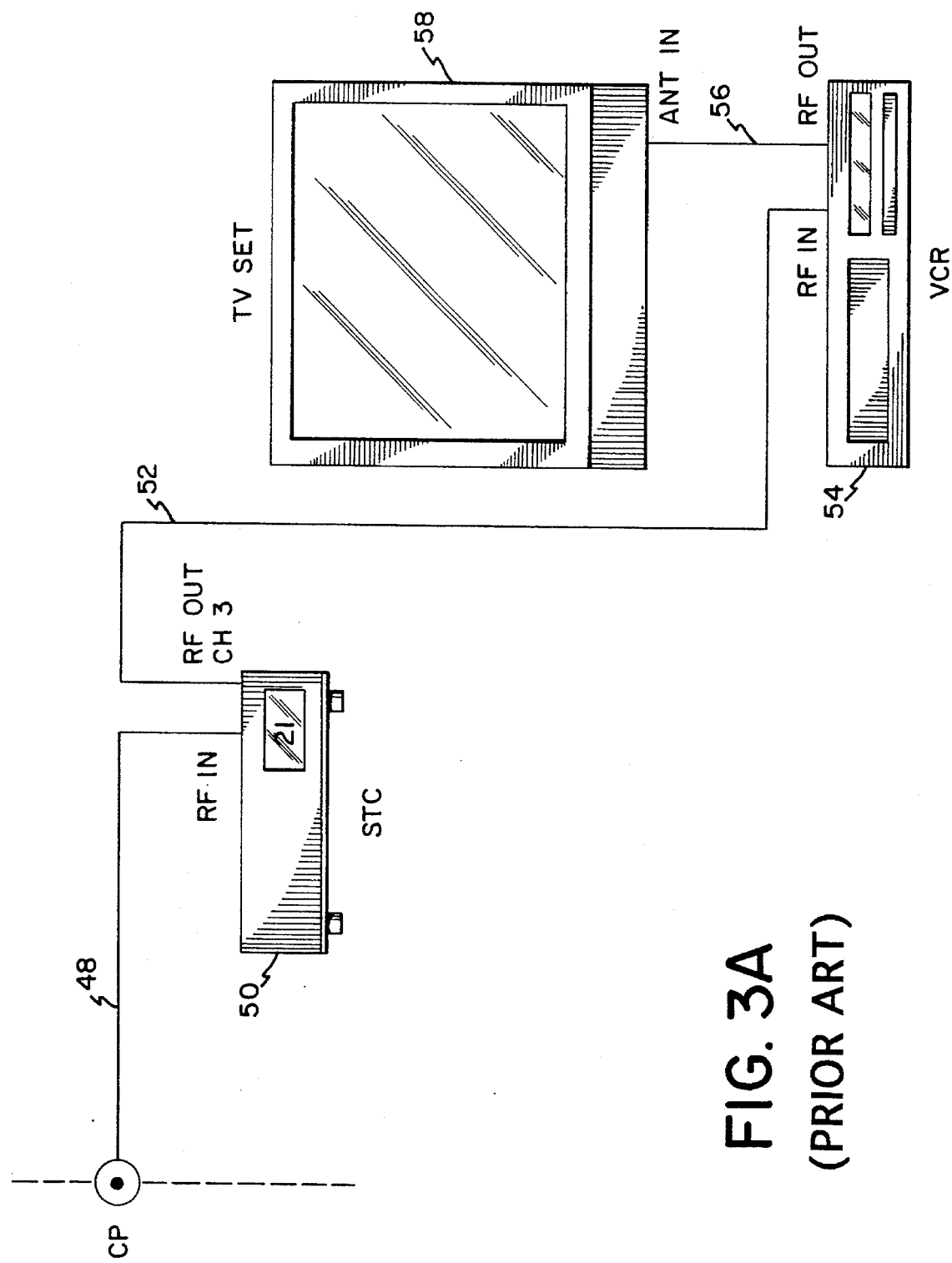
FIGS. 3A and 3B show conventional set-top converters hooked up to both a TV set and a VCR wherein only one may be used at a time for viewing or recording scrambled channels.
Figure 3B:
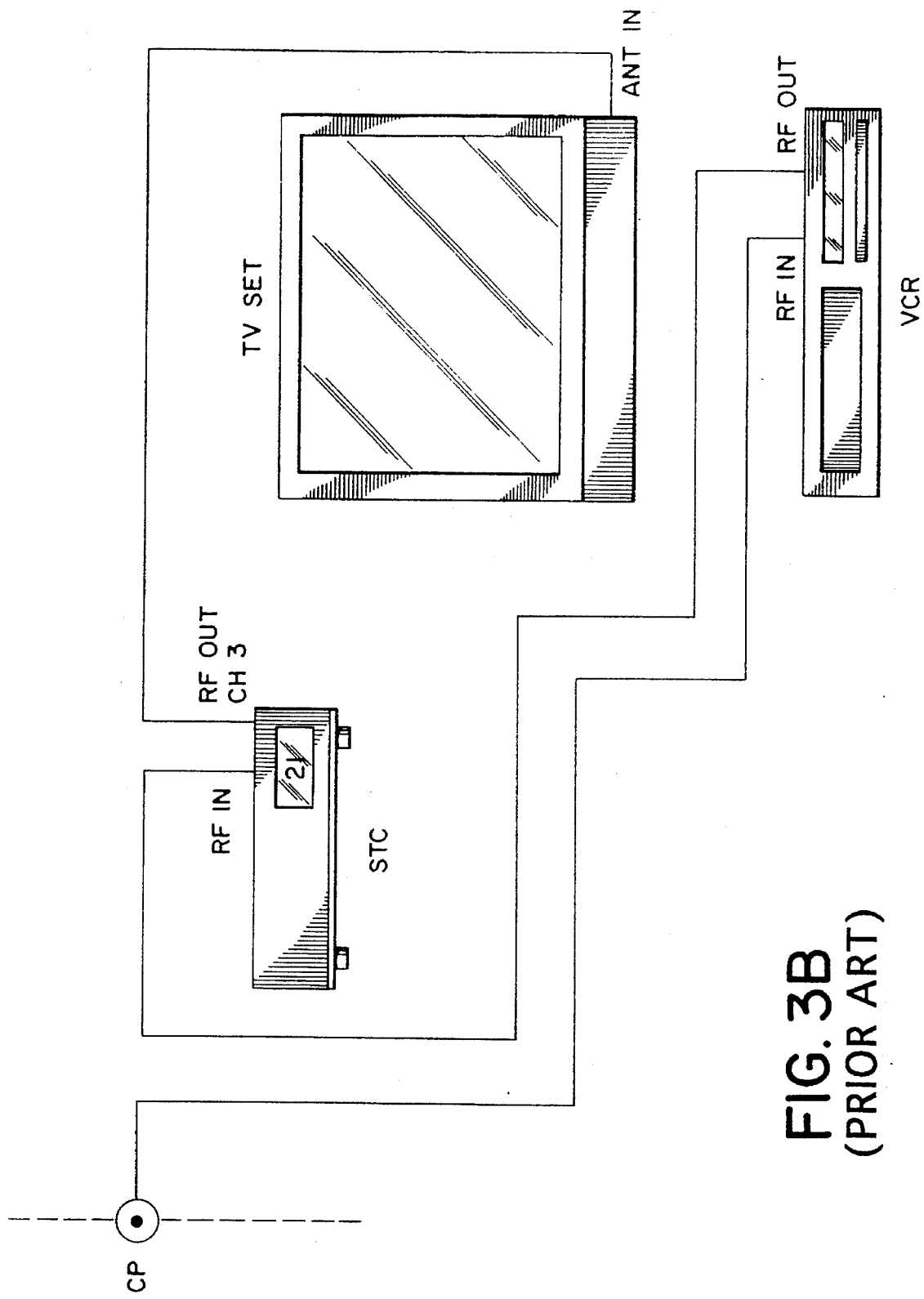
Figure 4:
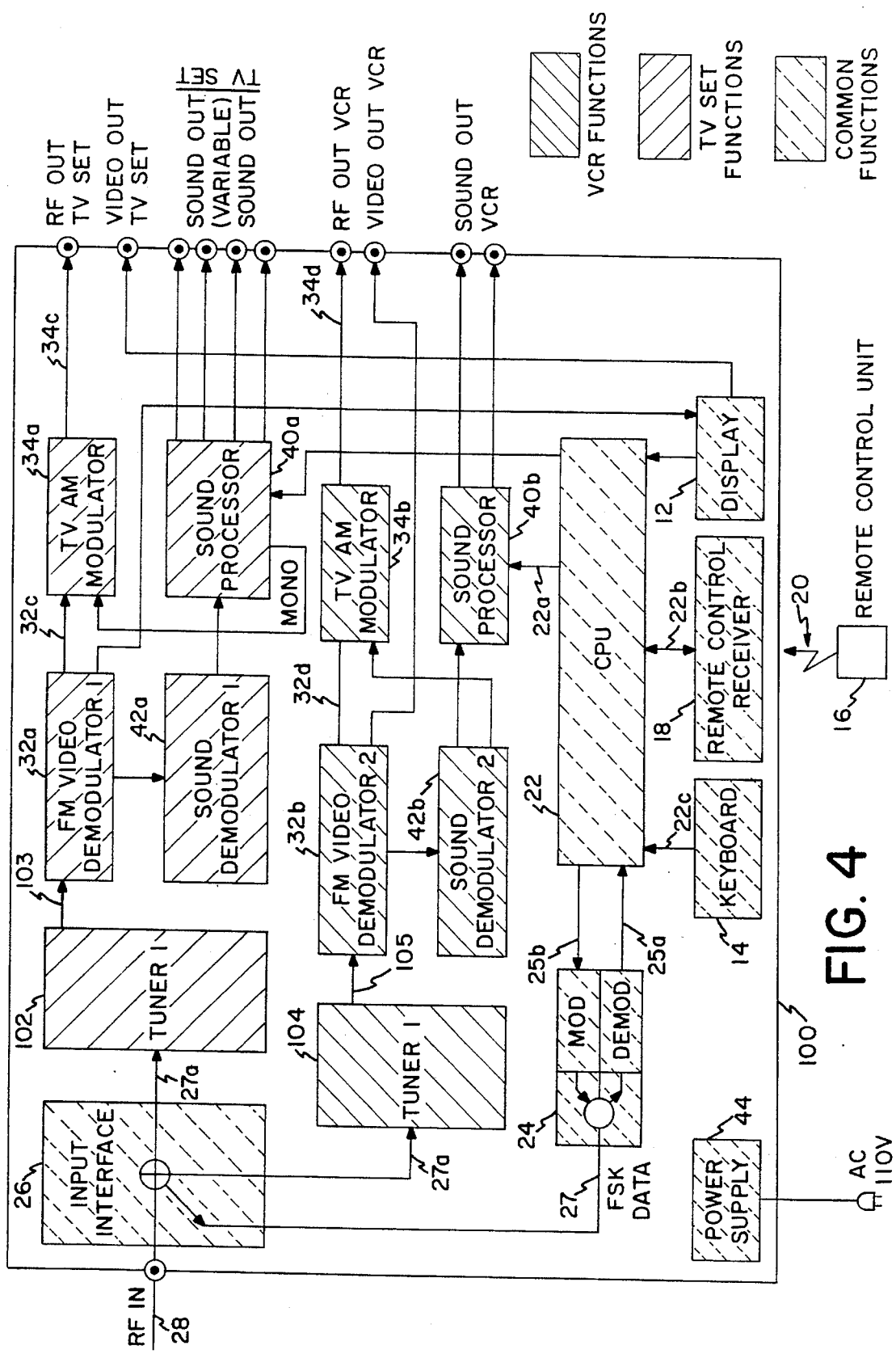
FIG. 4 shows a set-top converter, according to a first aspect of the present invention, having two tuners so as to enable recording and viewing of two channels simultaneously in a FM switched video architecture.

FIG. 4 shows a block diagram of a set-top converter 100, according to the first aspect of the present invention, with a dual selection capability. This set-top converter 100 is a combination of some of the functional blocks of the set-top converter shown in FIG. 2 with some common functions. It is useable in a switched video fiber-to-the-curb system such as described in the above-cited copending and co-owned applications. Among the functional blocks, tuners 102, 104 are the most important for cost reasons.

There are several principles that might have enabled the simplification of electronic functions: (1) a function might be deleted, (2) a function might be displaced towards a more favorable location, (3) a function might be shared, and (4) functions might be integrated functionally and/or physically.

In order to achieve the desired function of being able to record and watch any selected channel simultaneously, the second tuner 104 must be retained. Sharing first and second tuner functions within the set-top is possible with mechanical switching. Displacement and integration are both worth considering.

As for displacement, one could think about displacing the tuner function within the network. Since the network disclosed in the above-cited copending application has powered active nodes (optical network unit, remote terminal, end central office), this option is possible. One could expect the following benefits following this path: (1) cheaper and less bulky set-top converter, (2) return on investment requirements for network structural equipment is possibly less stringent then those for consumer equipment, (3) the displaced tuners within the network could be the subject of a further integration and sharing, taking into account the number of subscribers per network node and possible traffic considerations, and finally (4) even if a cost parity would be reached at worst, the set-top converter would be less bulky.

As for integration, if we take into account the double star switched video architecture shown in the above-cited copending applications, one can perceive that tuner functions are already provided at the remote terminal location. According therefore to an important teaching in the present invention, it is possible to use this tuner at the remote terminal as the "VCR" tuner. One can use one of the possible six STCs present in a subscriber's premises as dedicated to the VCR. In other words, of the six channels made available to the subscriber's premises, one particular frequency band will always be intended for use with a VCR but could be used for display as well. Instead of an expensive tuner, a simple filter can be used to bandpass only that fixed frequency that is dedicated to the VCR. The VCR will typically be hooked up thereto. It will be understood from the copending applications that, as a result of channel selection by the subscriber, conversion at the remote terminal, transport, interdiction and conversion within the optical network unit within the subscriber's neighborhood, a constant frequency allocation for the VCR is possible on the drop.

Figure 1:
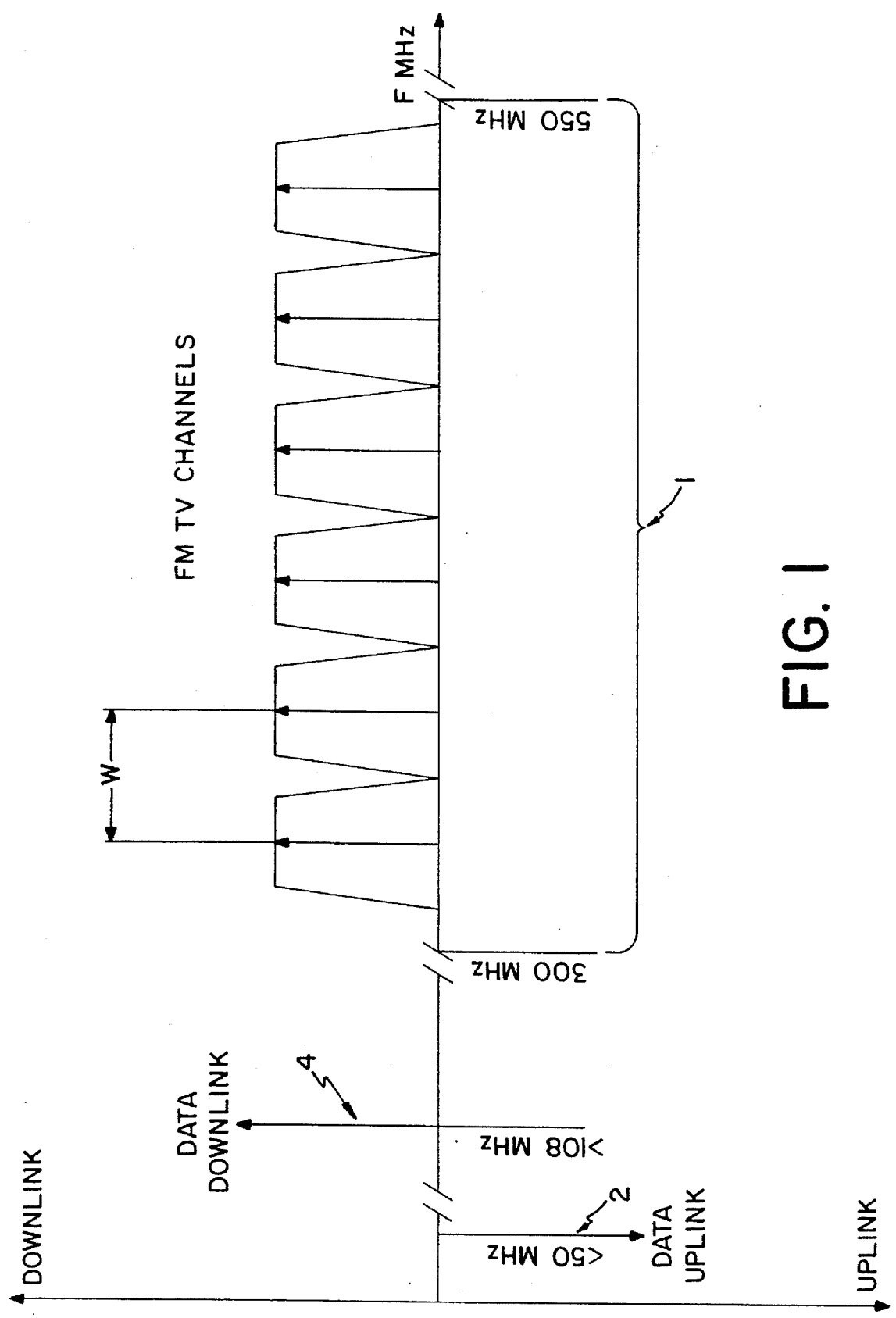
FIG. 1 shows a frequency plan at an RF interface in a subscriber neighborhood in a switched video system in an above-cited copending, co-owned patent application.
Figure 5A:
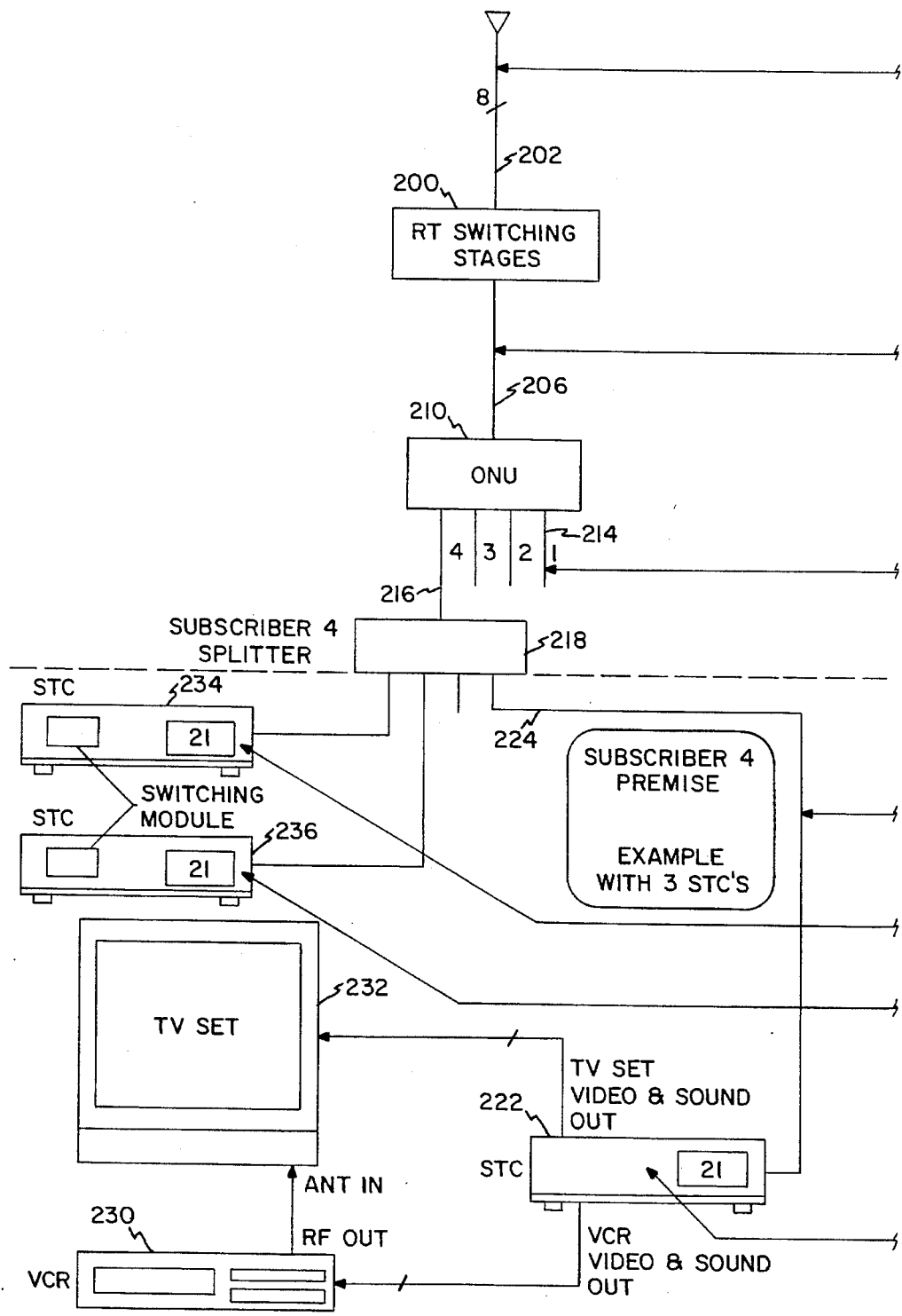
Figure 5C:
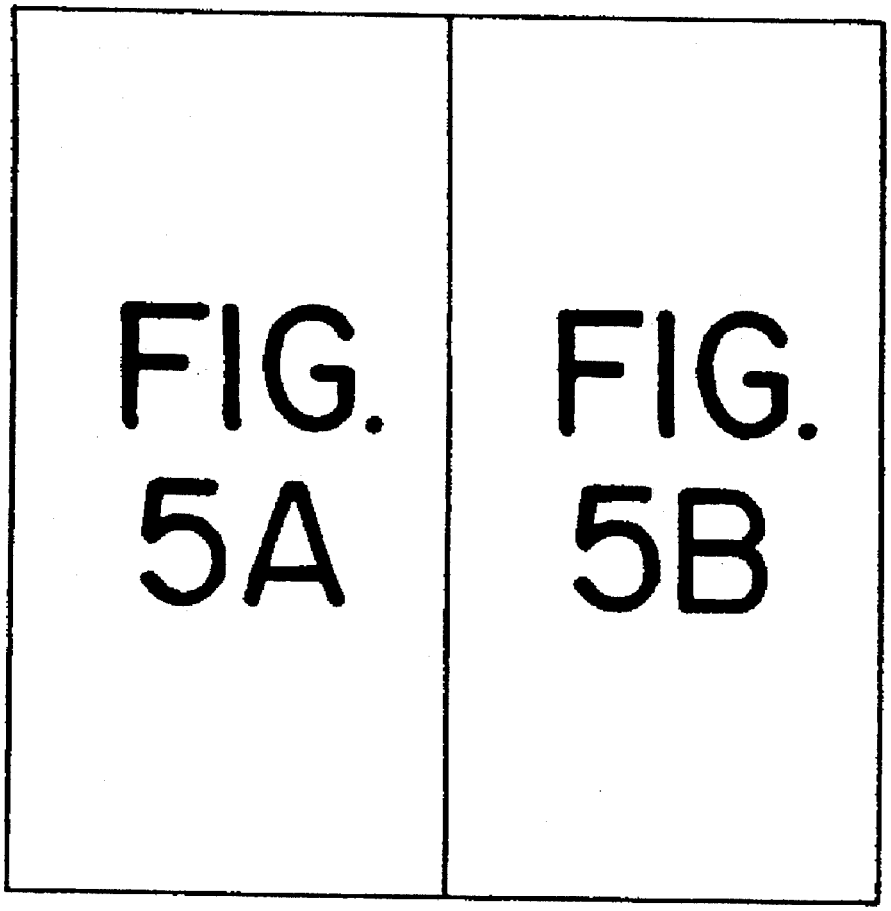
FIG. 5C shows the relation between FIGS. 5A and 5B.

According to this important teaching of the present invention, channel management principles are as shown in FIGS. 5A and 5B. FIG. 5C shows the manner in which FIGS. 5A and 5B fit together. A controlled selection is performed in Remote Terminal switching stages 200 among a large plurality, e.g., 192 channels available on an eight bus supertrunk 202 as shown by a spectrum 204 of one of the eight buses, each extending from about 80 MHz to 800 MHz with twenty-four channels each. If six tuners are available per subscriber premises, a selection controlled by the user (in an upstream control channel 2 of FIG. 1) is performed among the 192 channels available at the RT. Four subscriber premises are grouped for distribution purposes. The result is the constitution of a cluster of four groups of six channels on a line 206 as shown in a 720 MHz wide spectrum 208. The six channels per subscriber are thus positioned in a frequency division multiplexed block of twenty-four channels corresponding to four subscribers with six channels each. This block is transported on a fiber optic link 206 to an optical network unit (ONU) 210 in the subscribers' neighborhood.

At the ONU 210, the four subscriber groups are recovered and each positioned on a constant frequency allocation of, for example, 330–510 MHz. Thus, a first subscriber may be allocated the first six of the 24 selected channels in the distribution band as shown in a spectrum 212 as distributed on a coaxial drop 214 to subscriber number one's premises. Similarly, a coaxial drop 216 is connected from the ONU 210 to subscriber number four's premises. A splitter 218 distributes the top six of the 24 selected channels in the spectrum 208 to, in this case, each of four of subscriber four's televisions or set-top converters or other equipment. Of course, the splitter could be 1:6 or higher.

By dedicating the same one of the six frequency bands to a VCR, then the set-top converter can have an FM video demodulation/AM modulation channel dedicated to a VCR purpose and will not have to have a tuner in that channel because it will always be incoming on the same frequency band. Therefore, all that is needed is a filter tuned to that frequency band such that it excludes the other five channels within the 180 MHz, six channel band. Such may be implemented as a bandpass filter which is the same for every set-top converter.

Thus, as shown in FIG. 5A, a STC 222 is responsive to a signal line 224 having all six channels shown in the spectrum 220 of FIG. 5B and is able to filter out a dedicated VCR channel 226 and, with yet another filter, can similarly bandpass filter a dedicated TV set channel 228 in separate FM demodulation/AM modulation channels within the STC 222 itself. These separately processed signals are sent separately to the VCR 230 and/or TV set 232.

The example of FIGS. 5A and 5B shows two other STC's 234, 236 which, additionally, have tuners or filters capable of selecting from any one of the six channels present in the spectrum 220. As shown by a spectrum 238, the STC 234 has selected a fixed frequency channel 240 and the STC 236 has selected a fixed frequency channel 242. Each of the STCs 234, 236 could be provided with six selectable filters or with a plug-in tuner to be described below.

As a result of the above teaching, no extra tuner is needed in the set-top converter to obtain the VCR channel. Due to the constant frequency allocation of this VCR channel 226, a simple filtering within the set-top enables the separation from the other five remaining channels. A further demodulation process will deliver either a baseband or RF signal to the VCR (or display, if desired).

The STC 222 of FIG. 5A, as described so far, may require different types of set-top converters 222, as opposed to set-top converters 234, 236.

Figure 6:
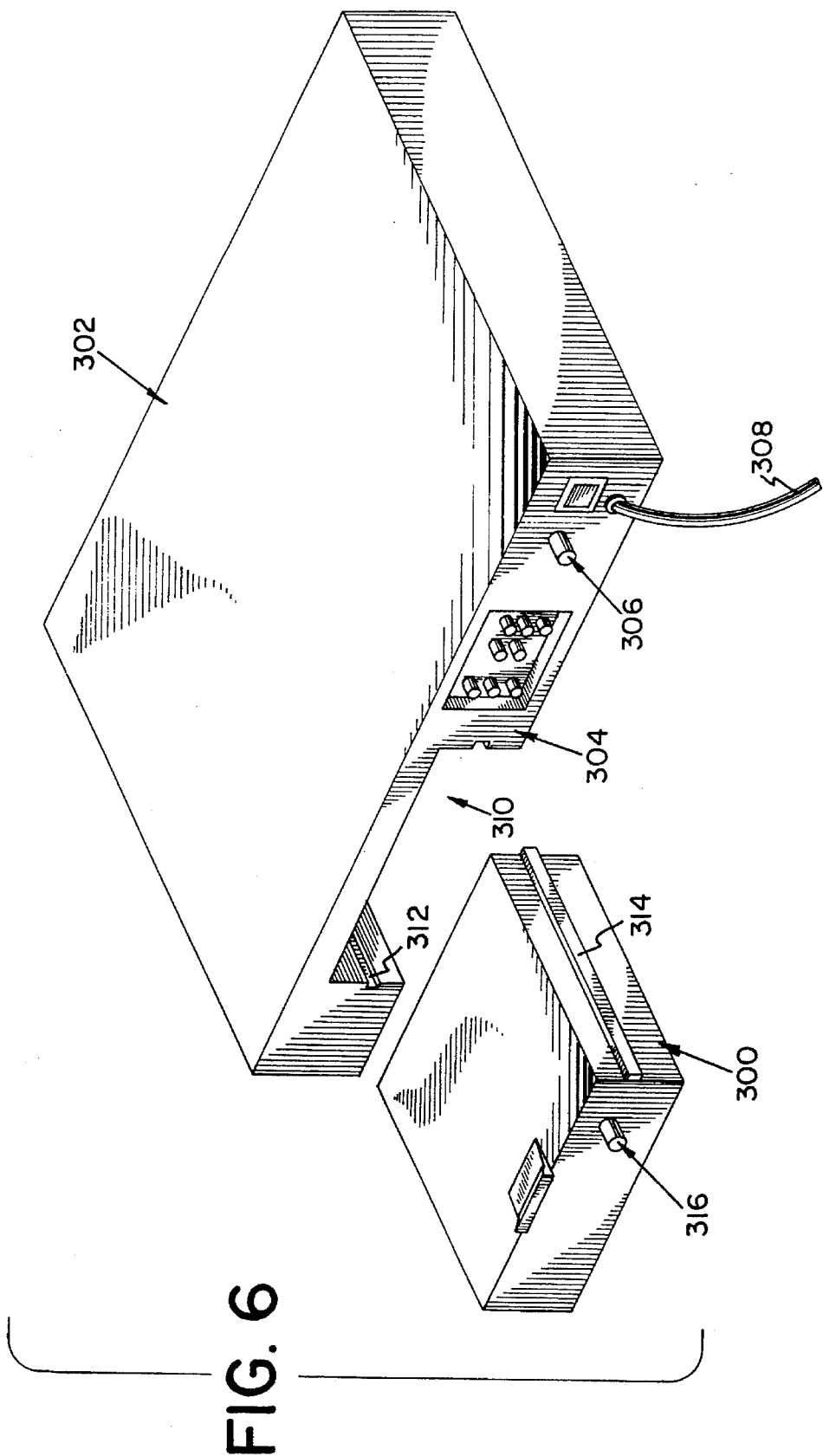
FIG. 6 shows a set-top converter, according to a third aspect of the present invention, into which a switching module may be plugged for cases in which a tuner is desired.
Figure 7:
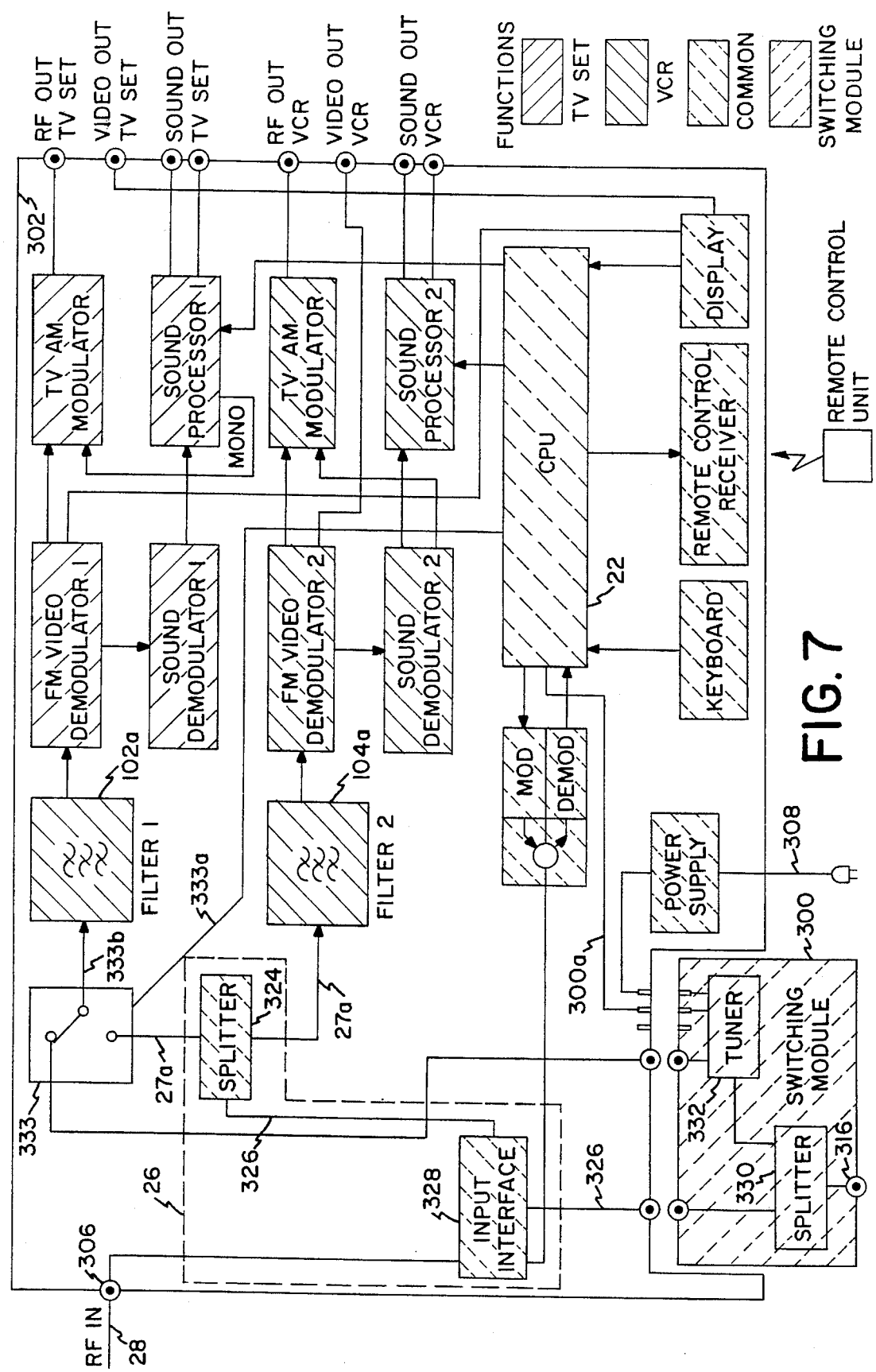
FIG. 7 shows a block diagram of both the set-top converter of FIG. 6 and the plug-in switching module of FIG. 6.

According to another important teaching of the present invention, dual filtering may be used within the set-top converter 222 in a basic set-top converter arrangement without tuning. This type of set-top can be used in a TV set/VCR combination or two of them can be used at different locations in the same subscriber's premises. For subscribers who want to operate more than two simultaneous channels from among the six, the set-top can be designed in such a way that a switching module can be plugged into a slot at the rear of the set-top converter as shown in FIG. 6. There, a switching module 300 may be purchased separately and plugged into a standard set-top converter 302 having a block diagram as shown in FIG. 7. Also shown in FIG. 7 is a block diagram of the switching module 300 of FIG. 6. As shown in the block diagram of FIG. 7, the switching module 300 interfaces with various circuits in the set-top converter 302, to be described below.

Referring back to FIG. 6, the set-top converter has a rear part 304 having an RF input 306 and a power line 308. A cavity 310 having mounting rail slide receptacles, one rail receptacle 312 of which is shown, receives the switching module 300 with rails 314 on either side for insertion in the rail receptacles 312. Once inserted, a new RF input 316 can be used instead of the connector 306.

Referring back to FIGS. 5A and 5B, it will be recalled that the set-top converter 302 could be used without the plug-in switching module 300 for performing the function of the set-top converter 222. The set-top converters 234, 236, however, need switching modules plugged in or equivalent additional filters so as to be able to select from among all six channels.

Referring back to FIG. 7, the block diagram of the set-top converter 302 is similar to that shown in FIG. 4 except having filters 102a, 104a in lieu of tuners 102, 104. The filter 102a would be tuned to the 30 MHz wide band 228 of FIG. 5B and the filter 104a would be tuned to the 30 MHz band 226 and dedicated for VCR usage. Under normal circumstances, without a plug-in switching module 300, a splitter 324 delivers all six channels from a signal line 326 connected to an input interface 328 to both filters 102a, 104a. The filter 102a can be tuned to pass only the 30 MHz wide TV-dedicated band 228 (of FIG. 5B) and to reject all others. The filter 104a, on the other hand, would pass only band 226.

This setup can be used by a multiple number of users in the same premises, up to six users. If it is desired to use one of the additional STC's 234, 236 to access the other four channels, it will be necessary to use a switching module 300 or equivalent filter bank. The switching module will be hooked up to the RF input cable and includes a splitter 330 and a double conversion tuner 332. The double conversion can be carried out by two mixers, a first one with a fixed frequency oscillator for recovering an intermediate frequency and a second one with a variable frequency oscillator, for bringing the selected program into the passband of the filter 102a. The CPU 22 controls a switch 333 by means of a control signal 333a that connects the tuner 332 to filter 102a and disconnects splitter 324. The splitter 330 in the switching module will provide the signal on the line 326, with all six channels, to the input interface 328 for interfacing same and for providing the interfaced six channels on line 326 to the splitter 324. The splitter 330 also provides the six channels to the tuner 332 for tuning one of the six channels for viewing by a TV set. A VCR or TV can also be hooked to the output of the second channel which can be used to record or view the dedicated VCR channel.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method, comprising the steps of:

providing, in response to subscriber program selection signals from a plurality of subscribers, corresponding program signals in a same plurality of fixed-frequency frequency division multiplexed (FDM) channels to each of the plurality of subscribers; and dedicating a same one of the same plurality of fixed-frequency frequency division multiplexed (FDM) channels as a dedicated subscriber video recorder channel for each of the plurality of subscribers to provide respective subscriber video recorder output signals for recording on an associated subscriber video recording device by each of the plurality of subscribers.

2. The method of claim 1, further comprising the step of subscriber selecting the one dedicated channel by bandpass filtering the plurality of channels.

3. The method of claim 1, further comprising the step of dedicating a first another one of the plurality of channels for bandpass filtering for use by a subscriber display associated with the subscriber video recording device.

4. The method of claim 3, further comprising the step of frequency converting a second another one of the plurality of channels to a frequency corresponding to the first another dedicated channel for use by another subscriber display.

5. Apparatus, comprising:

means, responsive to subscriber program selection signals from a plurality of subscribers, for providing corresponding program signals in a same plurality of fixed-frequency frequency division multiplexed (FDM) channels to each of the plurality of subscribers, a same corresponding one of the same plurality of fixed-frequency frequency division multiplexed (FDM) channels being a dedicated subscriber video recorder channel for each of the subscribers with respective subscriber video recorder output signal for recording on an associated subscriber video recording device; and means, responsive to the corresponding program signals in the same plurality of fixed-frequency frequency division multiplexed (FDM) channels, for providing for each subscriber the respective subscriber video recorder output signal for recording on the associated subscriber video recording device.

6. The apparatus of claim 5, wherein the means for providing the dedicated one of the channels includes means for selecting the one dedicated channel by bandpass filtering the plurality of channels.

7. The apparatus of claim 5, wherein a first another one of the plurality of channels is dedicated for use by a subscriber display associated with the subscriber video recording device and wherein the means for providing the dedicated one of the channels includes means for selecting the another one of the plurality of channels by bandpass filtering the plurality of channels.

8. The apparatus of claim 7, further comprising means for frequency converting a second another one of the plurality of channels to a frequency corresponding to the first another dedicated channel for use by another subscriber display.

9. A set-top converter for selecting programmed video in a switched video system for providing a plurality of frequency division multiplexed (FDM) fixed frequency channels on a signal to a subscriber's premises, comprising:

an input interface, responsive to the plurality of FDM fixed frequency channels on the signal in a broadband thereof and to a data downlink signal on the signal in a downlink band thereof and a data uplink signal on the signal in an uplink band thereof, for providing the plurality of FDM fixed frequency channels on an interfaced signal and for providing for the downlink and uplink signals on a bidirectional control signal;

first and second tuners, responsive to the plurality of FDM fixed frequency channels on the interface signal, for providing selected first and second fixed frequency channels, respectively;

first and second FM demodulators, responsive to the selected first and second fixed frequency channels, respectively, for providing first and second intermediate frequency or baseband video signals, respectively;

first and second AM modulators, responsive to the first and second intermediate frequency or baseband video signals, for providing first and second AM video signals, respectively;

a modem, responsive to the downlink signal on the bidirectional control signal, for providing a demodulated downlink control signal, and responsive to an unmodulated uplink control signal, for providing the uplink signal on the bidirectional control signal;

a central processing unit, responsive to the demodulated downlink control signal, for providing control signals and responsive to user control signals for providing the unmodulated uplink signal and the control signal; and user interface devices, responsive to user inputs, for providing the user control signals.

10. The set-top converter of claim 9, wherein the first and second tuners comprise first and second filters.

11. The set-top converter of claim 10, further comprising a plug-in switching module, comprising:

a splitter, responsive to the signal provided at an input of the module, for splitting the signal into first and second branch signals;

a tuner, responsive to the first branch signal and to a tuner control signal, for providing an additional selected TV program from one of the plurality of fixed frequency channels other than the selected first and second fixed frequency channels, wherein the set-top converter further comprises:

a switch, responsive to the interfaced signal, to the additional selected TV program and to a switch control signal from the CPU, for providing a switched signal to the first filter.

12. The set-top converter of claim 11, wherein the second filter is responsive to the second branch signal through the input interface.

* * * * *